F. THUE.
INSTRUMENT FOR MAKING PARALLEL CHANNELS FOR TOOTH ROOT PINS.
APPLICATION FILED JULY 18, 1914.
1,189,753.　　　　　　　　　　　　　　Patented July 4, 1916.
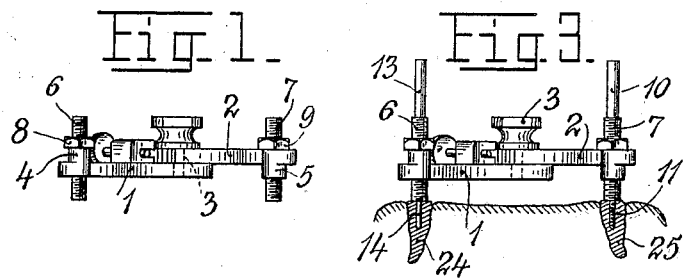
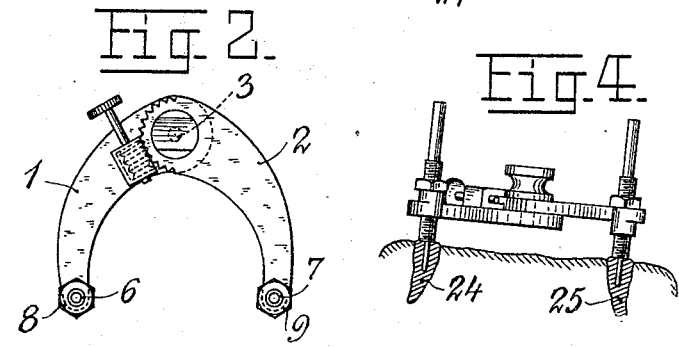
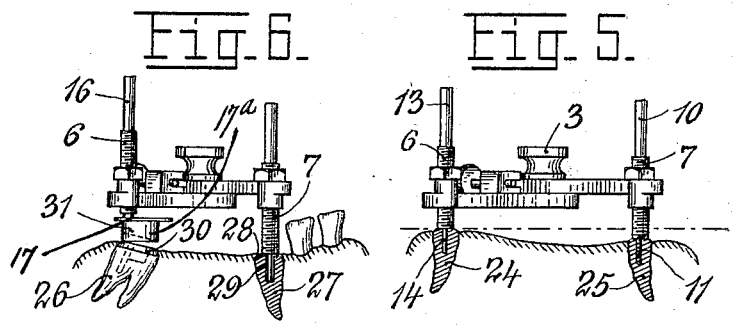
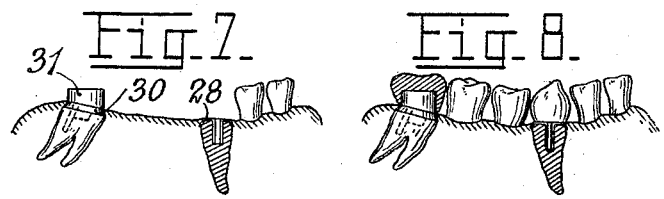
Witnesses
F. H. Logan
John N. Hoving
Inventor
F. Thue
by [signature]
Attorney

UNITED STATES PATENT OFFICE.

FRITHJOF THUE, OF CHRISTIANIA, NORWAY.

INSTRUMENT FOR MAKING PARALLEL CHANNELS FOR TOOTH-ROOT PINS.

1,189,753.

Specification of Letters Patent.

Patented July 4, 1916.

Application filed July 18, 1914. Serial No. 851,760.

*To all whom it may concern:*

Be it known that I, FRITHJOF THUE, dentist, subject of Norway, residing at Viktoria Terrasse 1, Christiania, Norway, have invented new and useful Improvements in Instruments for Making Parallel Channels for Tooth-Root Pins, of which the following is a specification.

In boring channels for tooth roots by the hand methods heretofore used, considerable difficulty is experienced in obtaining the channels exactly parallel.

The present invention has for its object to provide a device by means of which parallelism may be obtained and the works connected therewith be executed with facility, and with the precision necessary to obviate disadvantages of the kind referred to.

The annexed drawing shows the device and some coöperating parts and illustrates some of its uses.

Figure 1 is an elevation of the device; Fig. 2 is a plan view of the same; Figs. 3 to 8 are elevations showing different utilizations, and 6 showing the angle-plate post in position for use.

As shown in Fig. 1, the device comprises a compasslike instrument having two arms 1, 2 which are pivotally connected by a screw 3. The latter may be tightened for holding fast the arms in any position of adjustment. This adjustment may be facilitated by providing an arc of teeth on the hub portion of the arm 2 and on the arm 1 a worm intermeshing with said teeth (Fig. 2). The free end of each arm carries a sleeve 4, 5 and the axes of these sleeves are exactly perpendicular to the plane of relative movement of the arms. The sleeves are internally threaded in order to receive tubes 6 and 7 having external threads and jam-nuts 8, 9. Each tube has a bore of a definite diameter, corresponding to the shaft diameter of a set of pin-channel-drills (not shown). In connection with the instrument I also use a set of guide posts (not shown), two angle-plate posts corresponding thereto and a set of tube channel drills with corresponding posts (not shown).

Fig. 6 shows the plate post in position for use, two of which are provided with the device. The shaft 16 of this post has a diameter corresponding to the shaft of the drills and guide posts, and has at its lower end a plate 17 forming exactly a right angle to the shaft axis.

Fig. 3 illustrates in which manner the device is used in boring exactly parallel pivot channels in two roots 24, 25 located at the same height. First the channel is bored in one root 24, for instance by means of a drill 10 of suitable size depending upon the size of the root. This may be done by free hand. Then the guide post of corresponding size is inserted in one guiding tube 6 of the device and the device is introduced into the mouth, the lower part 14 of the post being passed down into the bored root channel. In the latter the post will fit snugly and therefore it may serve to hold the axes of both guiding tubes 6, 7 in exactly the same direction as the axis of the root channel. Now the screw 3 is released and by means of the worm the legs 1, 2 are properly adjusted, so that the other tube 7 is located just above the root 25. The screw 3 is tightened and into the tube 7 a drill of proper size is inserted by means of which the channel is bored in the root 25. The channel in this manner will be parallel to the channel in the root 24.

Fig. 4 shows the same mode of operation for roots in which parallel inclined channels are to be bored. But if the roots 24, 25 are so located that the plane passing through the top of one root perpendicular to the direction of the root channel is located above or below, the top face of the other root, the method shown in Fig. 5 is used, in which one guide tube 7 is shown to project farther downwardly than the other tube 6, the remainder of the operation being executed in the same manner as explained above.

The dentist may, for instance, have to construct a removable bridge between the second molar 26 provided with a cap 30 and the lateral incisor 27 (Fig. 6) provided with cap 28 with tube 29 fitting a bored channel. This requires laboratory work upon a gypsum model. A ring 31 attached by wax to the under face 17$^a$ of the plate 17 of an angle plate post 16 is cut successively and is by means of the instrument lowered against the cap 30, then fixed by wax or solder (Fig. 7), so that pivot tube 29 and cap 31 have exactly parallel sides. Fig. 8 shows the mounted bridge.

Many other variations in the use of the device may be made.

It is self-evident that instead of using two legs 1, 2 connected together like a compass the carrying parts of the tubes 4, 5 may be adjustable on a common bar although such an arrangement would be less suitable.

I claim as my invention:—

1. A dental parallel device comprising a pair of relatively movable guide tubes having bores; means for holding the tubes exactly parallel; an angle plate post snugly received in one of said bores; and an angle plate on said post.

2. In a dental parallel device, the combination of a pair of relatively movable internally threaded sleeves; means for holding said sleeves with their axes exactly parallel; and externally threaded tubes adapted to carry tools of various sorts and engaging in said sleeves.

3. In a dental parallel device, the combination of a pair of relatively movable internally threaded sleeves; means for holding said sleeves with their axes exactly parallel; externally threaded tubes engaging in said sleeves and having smooth bores; an angle plate post in one of said bores; and an angle plate on said post.

4. In a dental parallel device, the combination of a pair of pivotally connected arms; and guide tubes adjustably mounted in the free ends of said arms and having smooth bores adapted to receive the shanks of tools with axes exactly perpendicular to the plane of relative movement of the arms.

5. In an instrument for making parallel channels for tooth-root pins, the combination of a pair of pivotally connected arms one of which is provided with an arc of teeth at its inner end; a worm engaging the teeth and mounted on the other arm; an integrally threaded sleeve secured to the free end of each arm and having its axis exactly perpendicular to the plane of relative movement of the arms; and externally threaded tubes received in said sleeve and having smooth bores.

6. In an instrument for making parallel channels for tooth-root pins, the combination of a pair of pivotally connected arms one of which is provided with an arc of teeth at its inner end; a worm engaging the teeth and mounted on the other arm; an internally threaded sleeve secured to the free end of each arm and having its axis exactly perpendicular to the plane of relative movement of the arms; externally threaded tubes received in said sleeves and having smooth bores; and a drill and a post having shanks snugly received in said bores respectively.

7. In an instrument for making parallel channels for tooth-root pins, the combination of a pair of pivotally connected arms one of which is provided with an arc of teeth at its inner end; a worm engaging the teeth and mounted on the other arm; an internally threaded sleeve secured to the free end of each arm and having its axis exactly perpendicular to the plane of relative movement of the arms; externally threaded tubes received in said sleeves and having smooth bores; a post received in one of said bores; and a plate secured to said post at a right angle thereto.

In testimony whereof I have signed my name to this specification in the presence of two subscribing witnesses.

FRITHJOF THUE.

Witnesses:
 AXEL LAHN,
 MOGENS BUGGE.

Copies of this patent may be obtained for five cents each, by addressing the "Commissioner of Patents, Washington, D. C."